(12) United States Patent
Mandelstein et al.

(10) Patent No.: US 9,251,183 B2
(45) Date of Patent: *Feb. 2, 2016

(54) MANAGING TENANT-SPECIFIC DATA SETS IN A MULTI-TENANT ENVIRONMENT

(71) Applicant: International Business Machines Corporation, Armonk, NY (US)

(72) Inventors: Dan J. Mandelstein, Austin, TX (US);
Ivan M. Milman, Austin, TX (US);
Martin A. Oberhofer, Bondorf (DE);
Sushain Pandit, Austin, TX (US);
Charles D. Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/804,390

(22) Filed: Mar. 14, 2013

(65) Prior Publication Data

US 2013/0238557 A1    Sep. 12, 2013

Related U.S. Application Data

(63) Continuation of application No. 13/414,786, filed on Mar. 8, 2012.

(51) Int. Cl.
*G06F 17/30*    (2006.01)
*G06F 7/00*    (2006.01)

(52) U.S. Cl.
CPC ........ *G06F 17/30292* (2013.01); *G06F 17/303* (2013.01); *G06F 17/30575* (2013.01)

(58) Field of Classification Search
CPC ............ G06F 17/30292; G06F 17/303; G06F 17/30575
USPC .................. 707/602, 635, 756, 802, 803, 809
See application file for complete search history.

(56) References Cited

U.S. PATENT DOCUMENTS

| | | | |
|---|---|---|---|
| 2005/0234931 A1* | 10/2005 | Yip et al. | ...... 707/100 |
| 2008/0239985 A1 | 10/2008 | Karve et al. | |
| 2010/0030995 A1* | 2/2010 | Wang et al. | ...... 711/173 |
| 2010/0042449 A1 | 2/2010 | Thomas | |
| 2010/0156889 A1 | 6/2010 | Martinez et al. | |

(Continued)

FOREIGN PATENT DOCUMENTS

| | | |
|---|---|---|
| JP | 2011113103 A | 6/2011 |
| WO | 2011111532 A1 | 9/2011 |

OTHER PUBLICATIONS

Graham, Ross Lee, Mapping Relational Model-ER: Lecture 5: Database Technology, Department of Computer and Information Science, Linkoping University, Linkoping, Sweden.

(Continued)

*Primary Examiner* — Alicia Willoughby
(74) *Attorney, Agent, or Firm* — Patterson & Sheridan, LLP

(57) ABSTRACT

A method, computer program product and system for managing tenant-specific data sets in a multi-tenant system, by receiving a request to convert a data set in a physical data store from a first type of multi-tenant deployment to a second type of multi-tenant deployment, retrieving tenant identification metadata identifying a tenant making the request, modifying the data set in the physical data store based on the second type of multi-tenant deployment, and modifying metadata associated with an abstraction layer to allow the modified data set to be accessed.

7 Claims, 8 Drawing Sheets

(56) References Cited

U.S. PATENT DOCUMENTS

| | | | |
|---|---|---|---|
| 2010/0211548 A1* | 8/2010 | Ott et al. | 707/655 |
| 2010/0262632 A1* | 10/2010 | Jain et al. | 707/809 |
| 2011/0270886 A1 | 11/2011 | An et al. | |
| 2011/0289047 A1* | 11/2011 | Ahuja | 707/609 |
| 2011/0302277 A1* | 12/2011 | Baker | 709/219 |
| 2012/0011518 A1 | 1/2012 | Duan et al. | |
| 2012/0173513 A1* | 7/2012 | Agrawal et al. | 707/716 |
| 2012/0174085 A1 | 7/2012 | Driesen et al. | |
| 2012/0265726 A1* | 10/2012 | Padmanabhan et al. | 707/602 |
| 2013/0066940 A1* | 3/2013 | Shao | 709/201 |
| 2013/0159344 A1* | 6/2013 | Cahill et al. | 707/770 |
| 2013/0227097 A1* | 8/2013 | Yasuda et al. | 709/222 |
| 2014/0040656 A1 | 2/2014 | Ho et al. | |

OTHER PUBLICATIONS

U.S. Appl. No. 13/414,786, entitled Managing Tenant-Specific Data Sets in a Multi-Tenant Environment, filed Mar. 8, 2012.

Kobayashi, Shigenori et al, "SystemDirector Enterprise" for Improving the Development Efficiency of Multitenancy Compatible Applications, NEC Technical Journal, Apr. 23, 2010, vol. 63, No. 2, NEC, Japan.

International Search Report and Written Opinion for International Application No. PCT/IB2013/051398, dated Aug. 6, 2013.

* cited by examiner

MANAGING TENANT-SPECIFIC DATA SETS IN A MULTI-TENANT ENVIRONMENT

CROSS-REFERENCE TO RELATED APPLICATIONS

This application is a continuation of co-pending U.S. patent application Ser. No. 13/414,786, filed Mar. 8, 2012. The aforementioned related patent application is herein incorporated by reference in its entirety.

BACKGROUND

The field of the current invention relates to multi-tenant databases. More specifically, the field of the current invention relates to multi-tenant platform as a service (PaaS) and software as a service (SaaS) services (collectively "services" hereinafter).

Services can be offered in public, hybrid, and private cloud environments. Services offered by a service provider may access data stored in a database management system (DBMS) representing computerized information storage and retrieval systems. A DBMS may manage multiple databases, each of which may be owned by different entities. Services may be concurrently subscribed by multiple client organizations (tenants). Thus, the services process data for different tenants. For security and regulatory reasons, tenants demand different degrees of data isolation, which are specified as a "policy element" when the tenant subscribes to the services. It is even more important that the degree of isolation must be seamlessly changeable as security and regulatory requirements change over time. Thus, the service provider needs to implement a multi-tenant architecture for the services allowing data and configuration partitioning so that each tenant receives the appropriate level of data isolation.

There are three current deployment options for managing multi-tenant data. The first deployment option stores tenant data in separate databases, which is the simplest approach to data isolation. Computing resources and application code are generally shared between all tenants on a server, but each tenant has its own set of data that remains logically isolated from data that belongs to all other tenants. Metadata associates each database with the correct tenant, and database security prevents any tenant from accidentally or maliciously accessing other tenants' data. This option, however, tends to lead to higher costs for the service provider for maintaining equipment and backing up tenant data. Hardware costs are also higher than they are under alternative deployment options, as the number of tenants that can be housed on a given database server is limited by the number of databases that the server can support.

The second deployment option involves housing multiple tenants in the same database, with each tenant having its own set of tables and other database artifacts that are grouped into a schema created specifically for the tenant. This approach offers a moderate degree of logical data isolation for security-conscious tenants, though not as much as a completely isolated system would, and can support a larger number of tenants per database server.

A third deployment option involves using the same database and the same set of tables to host multiple tenants' data. A given table can include records from multiple tenants stored in any order, and a tenant identification column associates every record with the appropriate tenant. Of the three options, the shared schema approach has the lowest hardware and backup costs, because it allows one to serve the largest number of tenants per database server.

Converting database deployments from one option to another in a transparent manner is not currently supported, and can only be solved with manual data movement and system downtime. Furthermore, any applications accessing the database currently must be recoded upon such a conversion to reflect the changes to the database.

SUMMARY

Embodiments provide a method, computer program product and system for performing an operation to manage tenant-specific data sets in a multi-tenant system by receiving a request to convert a data set in a physical data store from a first type of multi-tenant deployment to a second type of multi-tenant deployment, retrieving tenant identification metadata identifying a tenant making the request, modifying the data set in the physical data store based on the second type of multi-tenant deployment, and modifying metadata associated with an abstraction layer to allow the modified data set to be accessed.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
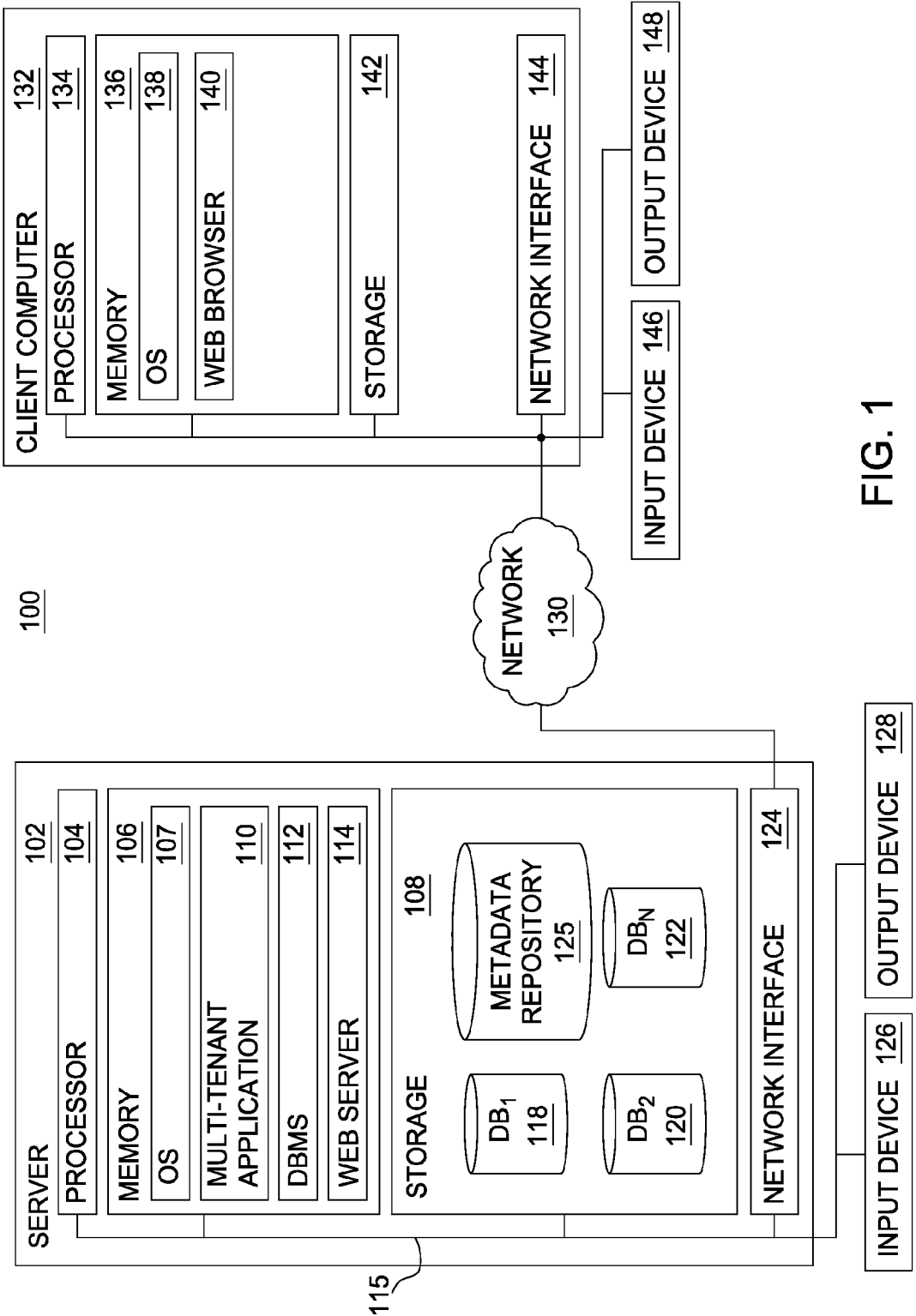
FIG. 1 is a block diagram illustrating a cloud computing environment, according to an embodiment of the invention.

Embodiments of the invention provide techniques for managing tenant-specific data in a multi-tenant environment. In some embodiments, a method is provided to convert from one multi-tenant database deployment to another. In some embodiments, the request to convert between multi-tenant deployments is received through an abstraction layer, such that the application making the request is unaware of the physical implementation being used to store tenant data. In some embodiments, an application is provided to convert the database deployments. In some embodiments, this application is part of a database management system (DBMS). The application may be configured to receive a request to convert a data set in a physical data store from a first type of multi-tenant deployment to a second type of multi-tenant deployment. The application may then retrieve, through an abstraction layer, tenant identification metadata identifying a tenant making the request. The application may then modify the data set in the physical data store based on the second type of multi-tenant deployment. Finally, the application may modify metadata associated with the abstraction layer to access the modified data set according to the second type of multi-tenant deployment.

It is understood in advance that although a detailed description on cloud computing is included, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes. A node in a cloud computing network is a computing device, including, but not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. A cloud computing node is capable of being implemented and/or performing any of the functionality set forth hereinabove.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, a multi-tenant database deployment conversion application could execute on a computing system in the cloud and convert a database from one multi-tenant deployment to another. In such a case, the multi-tenant database deployment conversion application could convert database deployments and store the physical data store and associated tenant metadata at a storage location in the cloud. Doing so allows a user to access this information from any computing system attached to a network connected to the cloud (e.g., the Internet).

FIG. 1 is a block diagram illustrating a cloud computing system 100 for providing software as a service, where a server provides applications and stores data for multiple clients (tenants) in one of three different deployments, according to an embodiment of the invention. The networked system 100 includes a server 102 and a client computer 132. The server 102 and client 132 are connected to each other via a network 130, and may be connected to other computers via the network 130. In general, the network 130 may be a telecommunications network and/or a wide area network (WAN). In a particular embodiment, the network 130 is the Internet.

The server 102 generally includes a processor 104 connected via a bus 115 to a memory 106, a network interface device 124, a storage 108, an input device 126, and an output device 128. The server 102 is generally under the control of an operating system 107. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 124 may be any type of network communications device allowing the server 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the storage 108 of the server contains a plurality of databases. In this particular drawing, four databases are shown, although any number of databases may be stored in the storage 108 of server 102. Storage 108 is shown as containing tenant-specific databases numbered 118, 120, and 122, each corresponding to different deployment options. Storage 108 is also shown containing metadata repository 125, which stores tenant identification information, system policies, and any other relevant information.

The input device 126 may be any device for providing input to the server 102. For example, a keyboard and/or a mouse may be used. The output device 128 may be any device for providing output to a user of the server 102. For example, the output device 108 may be any conventional display screen or set of speakers. Although shown separately from the input device 126, the output device 128 and input device 126 may be combined. For example, a display screen with an integrated touch-screen may be used.

As shown, the memory 106 of the server 102 includes a multi-tenant application 110 configured to provide a plurality of services to users via the network 130. As shown, the memory 106 of server 102 also contains a database management system (DBMS) 112 configured to manage a plurality of databases contained in the storage 108 of the server 102. The memory 106 of server 102 also contains a web server 114, which performs traditional web service functions, and may also provide application server functions (e.g. a J2EE application server) as runtime environments for different applications, such as the multi-tenant application 110.

As shown, client computer 132 contains a processor 134, memory 136, operating system 138, storage 142, network interface 144, input device 146, and output device 148, according to an embodiment of the invention. The description and functionality of these components is the same as the equivalent components described in reference to server 102. As shown, the memory 136 of client computer 132 also contains web browser 140, which is used to access services provided by server 102 in some embodiments.

The particular description in FIG. 1 is for illustrative purposes only; it should be understood that the invention is not limited to specific described embodiments, and any combination is contemplated to implement and practice the invention. Although FIG. 1 depicts a single server 102, embodiments of the invention contemplate any number of servers for providing the services and functionality described herein. Furthermore, although depicted together in server 102 in FIG. 1, the services and persistency functions of the two-tier the multi-tenant application 110 may be housed in separate physical servers, or separate virtual servers within the same server. The multi-tenant application 110, in some embodiments, may be deployed in multiple instances in a computing cluster. As is known to those of ordinary skill in the art, the modules performing their respective functions for the multi-tenant application 110 may be housed in the same server, on different servers, or any combination thereof. The items in storage, such as metadata repository 125, databases 118, 120, and 122, may also be stored in the same server, on different servers, or in any combination thereof, and may also reside on the same or different servers as the application modules.

Figure 2:
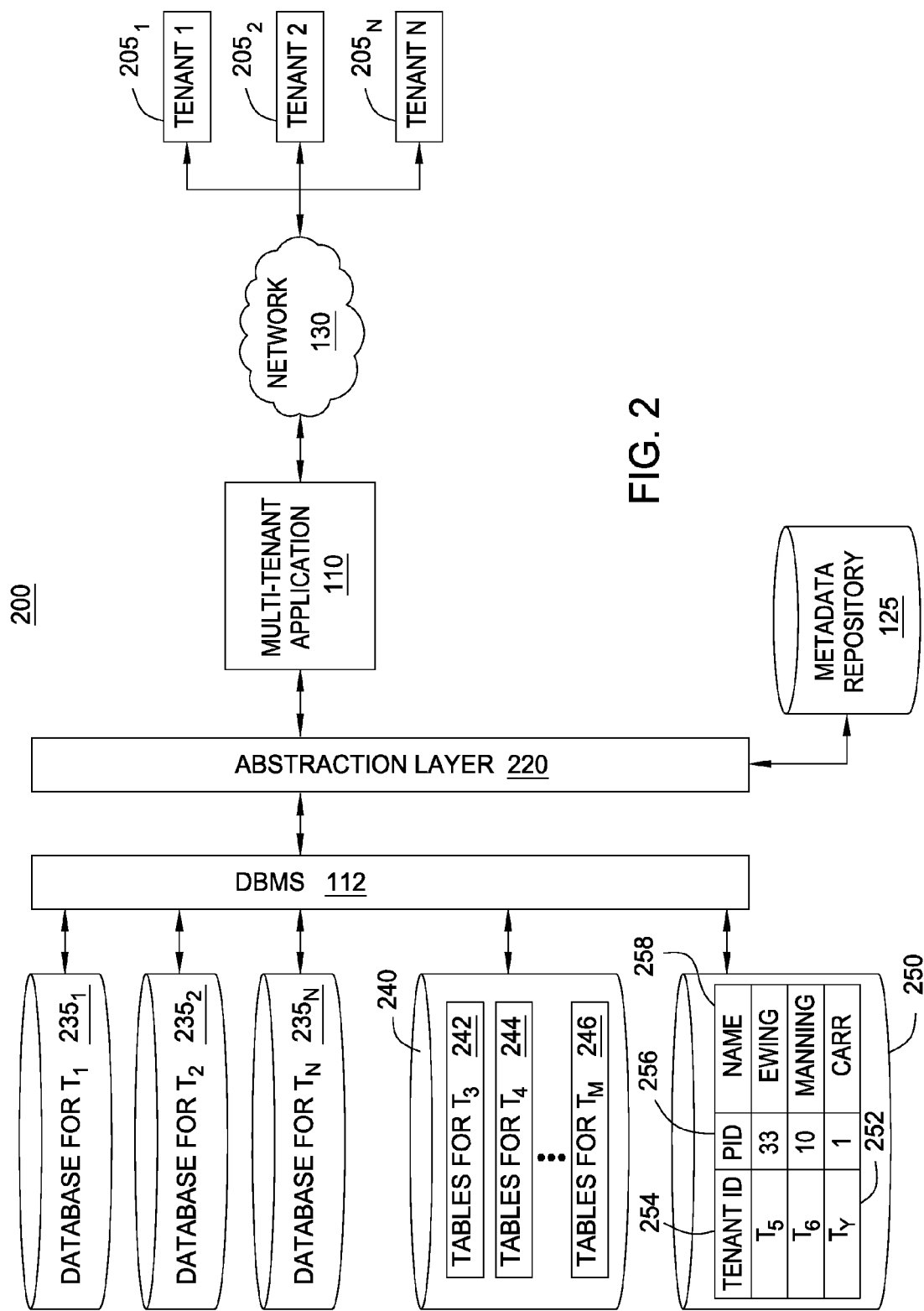
FIG. 2 is a block diagram illustrating an architecture for managing and converting deployment options in a multi-tenant environment, according to an embodiment of the invention.

FIG. 2 is a block diagram 200 illustrating an architecture for managing and converting deployment options in a multi-tenant environment, according to an embodiment of the invention. As shown, a plurality of tenants $205_{1-N}$ are connected via the network 130 to server 102 and access the multi-tenant application 110, contained in the memory 106 of server 102. Multi-tenant application 110, described in further detail below, is configured to provide services to the tenants, which in some embodiments includes a plurality of software as a service applications in a cloud computing environment. Also shown is abstraction layer 220, which serves as an intermediary between the multi-tenant application 110 and DBMS 112. Through abstraction layer 220 it is possible to complete a transparent conversion between different database deployment options, such that the multi-tenant application 110 need not be aware of the physical implementation of each database, and that the multi-tenant application 110 need not be recoded to reflect the changes in the database. Abstraction layer 220 is configured to receive queries from the multi-tenant application 110 and then insert tenant-specific information into the queries such that they are directed to the proper database and/or database tables. Tenant specific information may include, but is not limited to, details related to the physical implementation of databases, schemas, tables, and columns owned by each tenant. Such details may include names and locations of the databases, schemas, tables, and columns. In an alternate embodiment, abstraction layer 220 may be implemented as an extension of federation capabilities in the database management system. In some embodiments, abstraction layer also performs the functionality of a data placement layer, which is responsible for receiving conversion requests and for subsequently converting the data from one multi-tenancy deployment type to another.

In some embodiments, the tenant-specific information is stored in metadata repository 125. Embodiments of metadata repository 125 include a relational database, a content management system, or a file system which is referenced by an application module enforcing policies and data mappings. DBMS 112, described in further detail below, is a general database management system. As shown, DBMS 112 manages a plurality of databases, including separate physical databases $235_{1-N}$ for tenants $T_{1-N}$, respectively, shared database 240 which contains separate schemas 242, 244, and 246 for tenants $T_3$, $T_4$, and $T_M$, and shared database 250 which contains a single schema 252 for all of its tenants. In some embodiments, DBMS 112 may also directly manage metadata repository 125. As shown, database 250 contains a schema 252 having exemplary columns 254, 256, and 258, corresponding to tenant identification information, a key name, and a key value, respectively. The tenant identification information is stored and managed in metadata repository 125. The particular description in FIG. 2 is for illustrative purposes only; it should be understood that the invention is not limited to specific described embodiments, and any combination is contemplated to implement and practice the invention.

Figure 3:
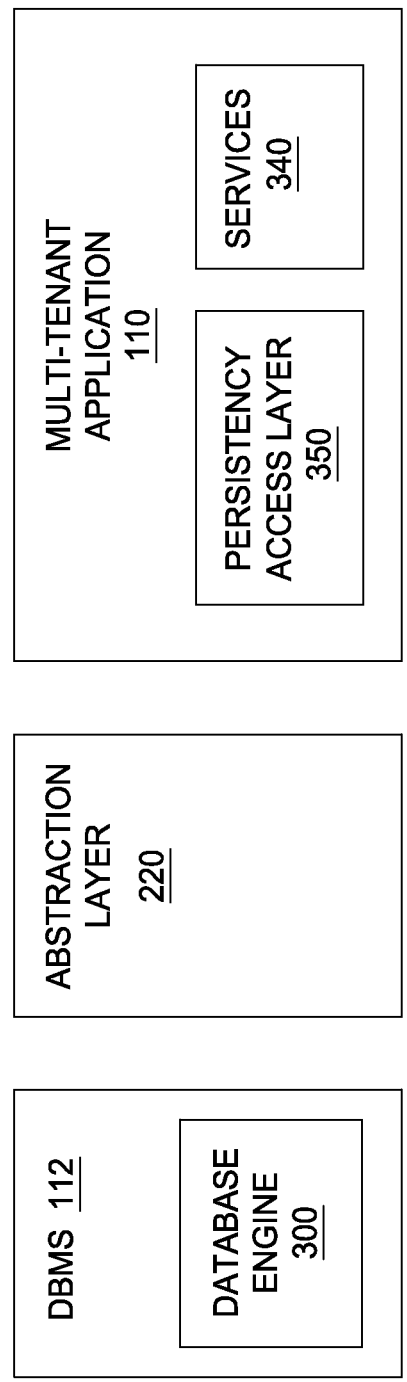
FIG. 3 is a block diagram illustrating components of a two-tiered application architecture, according to an embodiment of the invention.

FIG. 3 is a block diagram illustrating components of a two-tiered application architecture, according to an embodiment of the invention. As shown, the multi-tenant application 110 contains services 340 and a persistency access layer 350. Multi-tenant application 110 resides on the application tier on an appropriate application runtime, for example, the J2EE application runtime such as IBM® WebSphere® Application Server, (IBM and WebSphere are trademarks of International Business Machines Corporation, registered in many jurisdictions worldwide). Services 340 include any software as a service (SaaS) solution, where applications are executed on a server and accessed by a user via a network, for example, the Internet. Examples of SaaS applications include, but are not limited to applications for master data management (MDM), accounting, collaboration, customer relationship management, enterprise resource planning, invoicing, human resource management, content management and service desk management. Persistency access layer 350 is an interface configured to allow the multi-tenant application 110 and its services 340 access to the plurality of databases managed in the multi-tenant environment in a transparent manner when coupled with abstraction layer 220. As the multi-tenant application 110 and its services 340 are unaware of the physical implementation of the databases they reference, persistency access layer 350 provides a link between the multi-tenant application and the abstraction layer hiding the details of the physical implementation of the databases. Through persistency access layer 350, the multi-tenant application 110 and its services 340 read and write data to the databases by generating queries which are sent to the abstraction layer for further extrapolation and processing.

As shown, the multi-tenant application 110 is connected to abstraction layer 220, providing functionality as described above. Abstraction layer 220 provides a layer of abstraction between the multi-tenant application 110 and DBMS 112, according to an embodiment of the invention. As shown, DBMS 112 contains database engine 300, which controls standard database functionality, such as reads, writes, queries and other database management tools. In some embodiments, DBMS 112 may perform the data placement layer functionality performed in some embodiments by abstraction layer 220 as described above.

Figure 4:
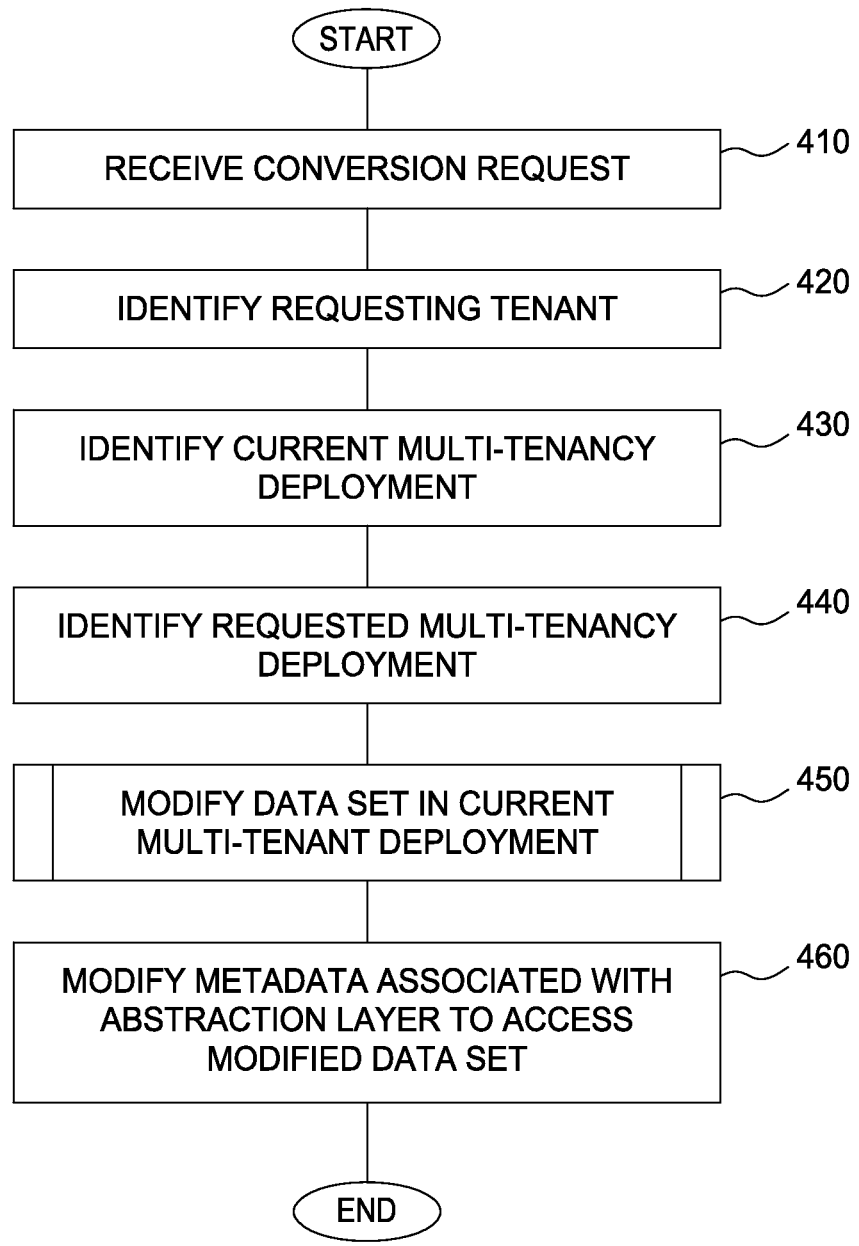
FIG. 4 is a flow chart illustrating a method for converting database deployment options, according to an embodiment of the invention.

FIG. 4 is a flowchart depicting a method 400 for converting a tenant-specific data set from one multi-tenant deployment option to a second multi-tenant deployment option, according to an embodiment of the invention. In one embodiment, the multi-tenant application 110 executes the steps of method 410. The method begins at step 410, where a conversion request is received by the multi-tenant application 110 from a tenant. At step 420, the multi-tenant application 110 identifies the requesting tenant by accessing information contained in metadata repository 125. In embodiments where metadata repository 125 is a relational database, the multi-tenant application 110 connects to metadata repository 125 to retrieve data associated with the requesting tenant. At step 430, the multi-tenant application 110 identifies the tenant's current multi-tenant deployment option. In one embodiment, information from metadata repository 125 is used to determine the current multi-tenant deployment option. In another embodiment, the current multi-tenant deployment option is provided as input by the user. Generally, any suitable method to determine the current deployment option is contemplated.

At step 440, the multi-tenant application 110 identifies the deployment option requested by the tenant. In some embodiments, the multi-tenant application 110 receives input from the user defining the requested multi-tenant deployment. At step 450, the multi-tenant application 110 modifies the data set in the current deployment to fulfill the tenant's conversion request. Embodiments of step 450 are described below with respect to FIG. 5 and FIG. 6. At step 460, the multi-tenant application 110 modifies metadata associated with abstraction layer 220 to allow the multi-tenant application 110 and its services 340 to access the converted database without code modifications. Because the multi-tenant application 110 and its services 340 are coded without reference to the actual physical implementation of the underlying databases, the abstraction layer 220 must modify the queries submitted by the persistency access layer 350 of the multi-tenant application 110 to reflect the selected deployment option in the physical implementation of the databases. Without such modification, the multi-tenant application 110 and its services 340 would be unable to access the underlying databases in a transparent manner without code change. In some embodiments, step 460 includes the multi-tenant application 110 updating metadata contained in metadata repository 125 to provide abstraction layer 220 and its queries a link to the converted database corresponding to the tenant's requested deployment. If the requested deployment is a private database, metadata repository 125 is modified with information sufficient to link the private database now owned by the tenant with abstraction layer 220. In some embodiments of step 460, the multi-tenant application 110 modifies queries in abstraction layer 220 associated with the requesting tenant's databases to include the new identifying information. If the requested deployment is a private schema in a shared database, the multi-tenant application 110 may update entries contained in metadata repository 125 to contain a reference to the private schema created for the requesting tenant. In some embodiments, queries in abstraction layer 220 associated with the requesting tenant are rewritten to contain clauses identifying the private schema information. If the requested deployment is a shared schema in a shared database, the appropriate tenant identifier is retrieved from metadata repository 125 and updated or inserted to queries in abstraction layer 220 associated with the tenant.

Figure 5:
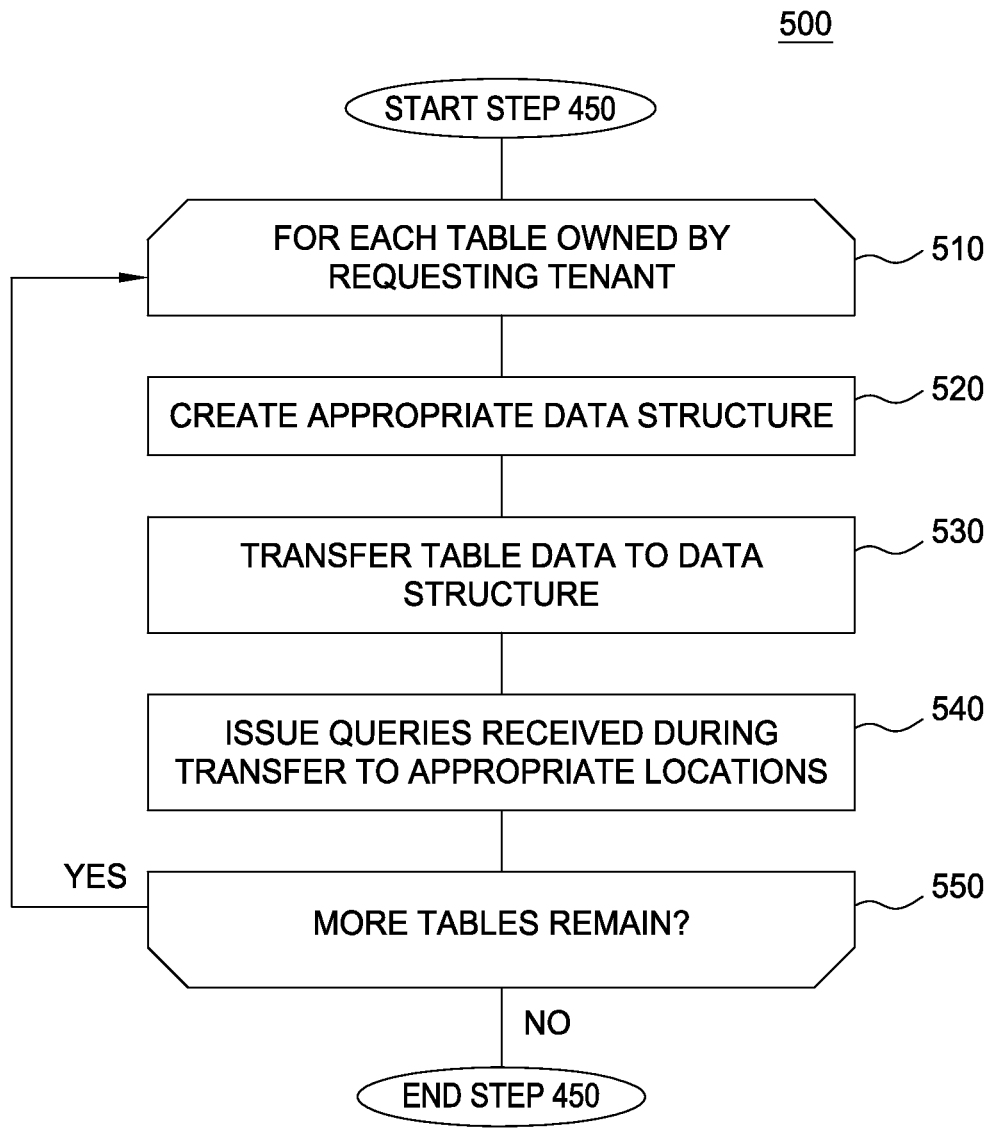
FIG. 5 is a flow chart illustrating a method for transferring data to complete a conversion of a database from one multi-tenant deployment option to another, according to an embodiment of the invention.

FIG. 5 is a flowchart depicting a method 500 corresponding to step 450, according to an embodiment of the invention. In some embodiments, the multi-tenant application 110 performs the steps in method 500. The method begins at step 510, where the multi-tenant application 110 begins executing a loop which includes steps 520-550 for converting a tenant database from one deployment option to another deployment option for each table owned by the requesting tenant. At step 520, the multi-tenant application 110 creates an appropriate data structure to accommodate the requested deployment conversion. In one embodiment, the data structure may be a private database owned by the requesting tenant, as depicted by each of the elements $235_{1-N}$ in FIG. 2. In another embodiment, the data structure is a private schema, owned by the requesting tenant, contained in a shared database as depicted by element 240 of FIG. 2. The method then proceeds to step 530, where the table current table is transferred to the created data structure. The transfer may occur by any number of means, including but not limited to moving and copying the table.

The method then proceeds to step 540, which permits an "online" table transfer, such that the database remains available, and queries received during the transfer are issued to the appropriate tables for execution. Accordingly, a set of rules for each type of query received during the transfer must be defined. In one embodiment, select queries are issued to both the original and transferred tables, resulting in respective result sets. While the data is transferred, for each read query requested by the persistency layer of the multi-tenant application the query is redirected by the abstraction layer 220 to both locations and a UNION is then applied to the resulting data sets and the combined result is returned as a result responsive to the select query. In one embodiment, insert queries are issued to the transferred tables, such that new database entries are only created in the transferred tables in the requested deployment option. In one embodiment, update and delete queries are issued to and reflected in both the original and transferred tables. By accepting queries in this fashion, the database remains fully available and operational while the data is transferred. The advantage of the online transfer is that the subscribed tenant does not notice that the data is moved from one deployment option to the next so the service remains available at all times. Without this, a downtime for the tenant would be the consequence which might not be acceptable—particularly if the amount of data to be moved is very large which could cause hours or a few days of downtime. The method then proceeds to step 550, where the multi-tenant application 110 determines whether more tables remain to be transferred. If more tables remain, the method returns to step 510, otherwise the method 500 ends.

In some embodiments, the transfers depicted in method 500 may be further improved by offering the IBM® FlashCopy® function for higher data transfer rates and a diminished impact on system performance while processing the data transfer. (IBM and FlashCopy are trademarks of International Business Machines Corporation registered in many jurisdictions worldwide.).

Figure 6:
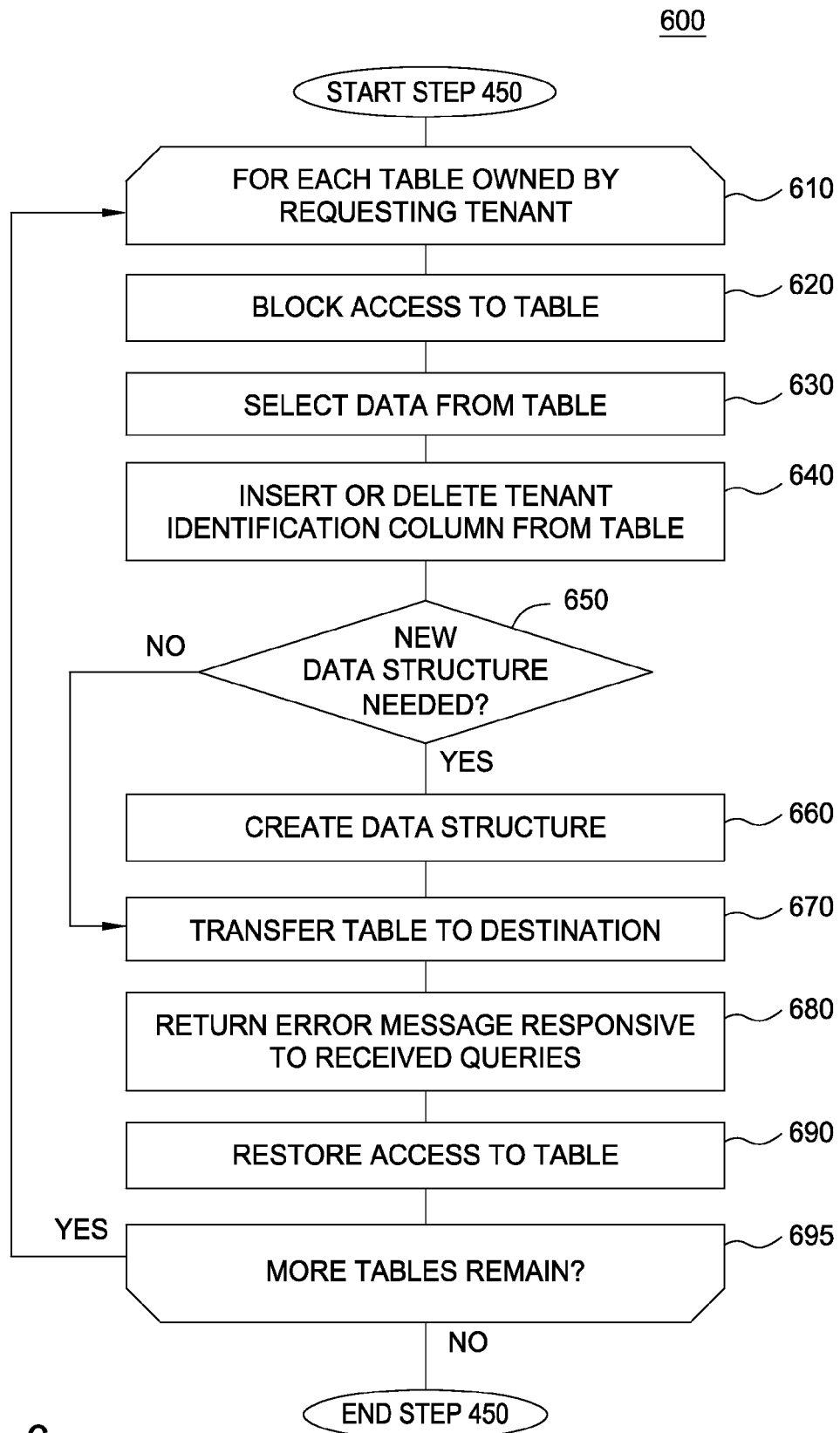
FIG. 6 is a flow chart illustrating a method for transferring data to complete a conversion of a database from one multi-tenant deployment options to another, according to an embodiment of the invention.

FIG. 6 is a flowchart depicting a method 600 corresponding to step 450, according to another embodiment of the invention. In some embodiments, the multi-tenant application 110 performs the steps in method 600. The method begins at step 610, where the multi-tenant application 110 begins executing a loop which includes steps 620-695 for converting a tenant database from one deployment option to another deployment option for each table owned by the requesting tenant. At step 620, the multi-tenant application 110 blocks access to the current table in some embodiments. In some embodiments, blocking access is accomplished by setting in a flag in the abstraction layer 220 which restricts access to the table. Blocking access to the table (and subsequently restoring access) is only required in cases where the current deployment option is a private database owned by the requesting tenant or a private schema in a shared database. Blocking access (and subsequently restoring access) is optional in embodiments where the current deployment is a shared schema in a shared database, as the data of other tenants would also be blocked. By blocking access to the table until the transfer is complete, modifications will not be permitted, such that an exact copy of the database will be transferred. At step 630, the multi-tenant application 110 selects data contained in the table to be transferred. In embodiments where the current deployment option is a private database owned by the requesting tenant, a statement requesting the selection of all data is issued to select the table data. In one embodiment, the current deployment option is a private schema in a shared database, and a statement selecting all data from the schema table is issued, wherein the schema is owned by the requesting tenant, and the schema information is obtained from metadata repository 125. For example, where the table is in a relational database, an SQL query could be written as "select * from schema.table". In embodiments where the current deployment is a shared schema in a shared database, a statement selecting all data where the tenant identification column entry equals the tenant identification information associated with the requesting tenant is issued to select the data, and the tenant identification information is obtained from metadata repository 125. For example, where the table is in a relational database, an SQL query could be written as "select * from table where tenant=<tenant>".

Once the data has been selected, the method proceeds to step 640, where the multi-tenant application 110 inserts or deletes a column containing tenant identification information from the table resulting from the select statement executed in step 630, depending on the requested deployment option. Depending on the current and requested deployment options, tenant identification information may or may not be required, and needs to be dealt with appropriately. In embodiments where the current deployment is a shared schema in a shared database, a tenant identification column is returned with the data selected in step 630. The destination database in these embodiments will not require a column containing this tenant identification information, and it will be deleted accordingly. In embodiments where the current deployment is a shared schema in a shared database, the select query issued at step 630 may be modified such that the column containing tenant identification information is not selected, rendering subsequent deletion unnecessary. In embodiments where the destination is a shared schema in a shared database, the tenant identification column is necessary to indicate which tenant owns the data. Thus, for each record in the result set of the select statement executed at step 630, a column containing the tenant identification information will be inserted, wherein the tenant identification information is obtained from metadata repository 125.

The method then proceeds to step 650, where the multi-tenant application 110 determines whether a new data structure is required to complete the deployment conversion. If a new data structure is not needed, the method proceeds to step 670. Otherwise, at step 660 the multi-tenant application 110 creates an appropriate data structure. The data structure may be one or more of a new private database owned by the tenant, a new table in a private database owned by the tenant, a new private schema owned by the tenant in a shared database, or a new table in a private schema owned by the tenant in a shared database. In these embodiments, the multi-tenant application 110 obtains the tenant identification information necessary to create the data structure from metadata repository 125.

Once the appropriate data structure has been created, the method proceeds to step 670, where the multi-tenant application 110 transfers the table to its destination data structure. The transfer may occur by any number of means, including but not limited to moving and copying the table. The method then proceeds to step 680, which provides that for any query issued to the tables being transferred, an appropriate error message is returned until the transfer is complete. Once the table has been transferred, the method proceeds to step 690, where the multi-tenant application 110 restores access to the table such that the table may be accessed by the tenant's applications. In some embodiments, access to the table is restored by removing the flag set in abstraction layer 220 which blocked access to the table, as well as modifying data in abstraction layer 220 to associate the switched deployment with the tenant. In some embodiments, multi-tenant application 110 drops private databases as well as tables in a private schema from the original deployment, as they may no longer be needed in light of the switched deployment. The method then proceeds to step 695, where the multi-tenant application 110 determines whether more tables owned by the requesting tenant need to be transferred. If more tables exist, the method proceeds back to step 610. Otherwise, the method ends.

Alternative embodiments of method 600 include the ability to avoid including "where" statements of the nature "where tenant=<tenant>" in queries by creating per tenant database views for deployments in the form of a shared schema in a shared database. These database views may be created and managed through their lifecycle by abstraction layer 220. A database view consists of stored queries accessible as a virtual table in a relational database composed of the result set of a query. Unlike ordinary tables (base tables) in a relational database, a view does not form part of the physical schema, but is a dynamic, virtual table computed or collated from data in the database. Changing the data in a table alters the data shown in subsequent invocations of the view. In another embodiment, the select queries might not target all the data in a single step but process it in chunks where a series of select queries is issued each retrieving a complementary portion of the data in several iterations following the same design concept.

In all cases, once the data transfer is completed, the data in the source area is appropriately released by freeing the database resources which might mean in some cases the drop of the database or in other cases with appropriate drop/delete queries.

Through the use of distributed, redundant database architecture and an abstraction layer as described herein, the physical implementation of multi-tenant deployments may be hidden from the multi-tenant application 110. By hiding the implementation details, the multi-tenant application 110, and each of the services 340 it offers will not need to be recoded each time a new tenant subscribes to a service or requests a deployment conversion.

Figure 7:
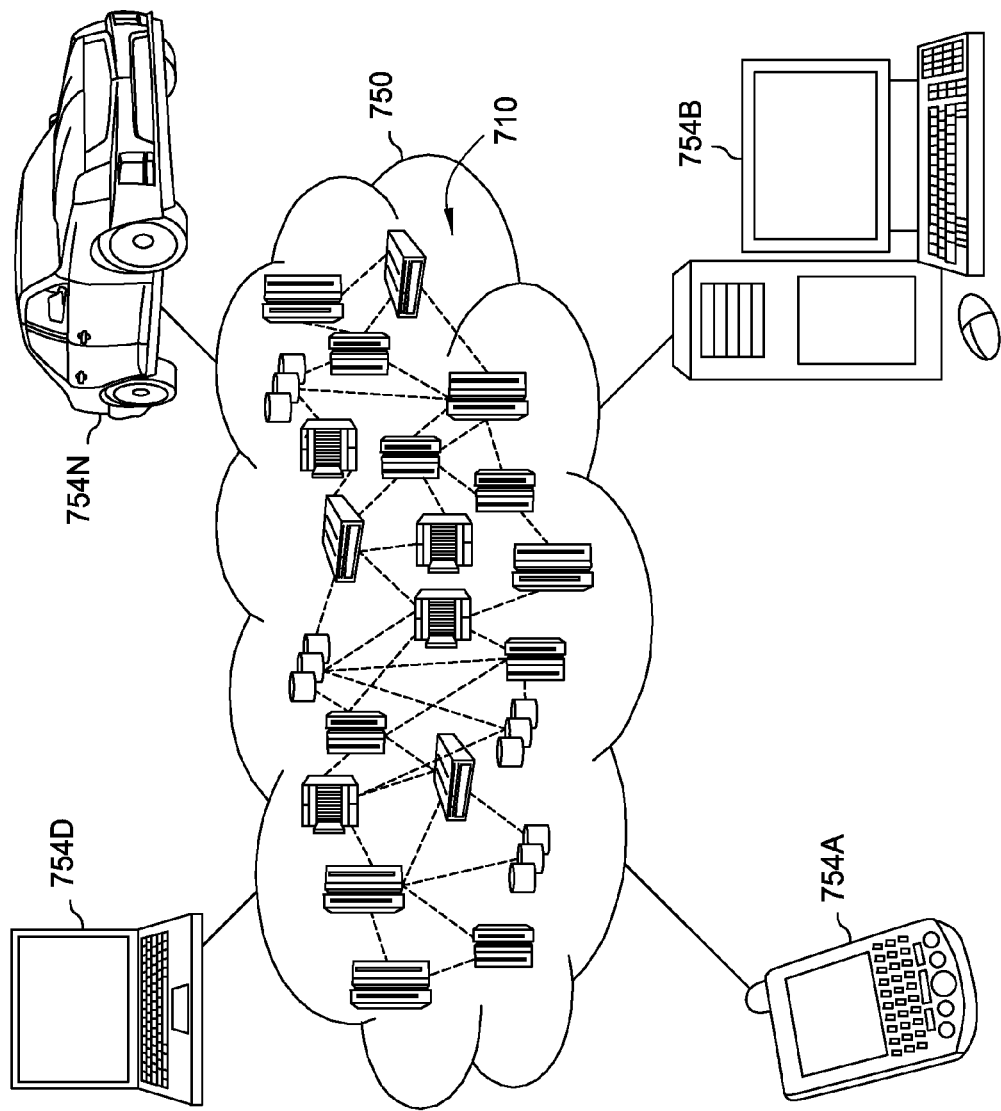
FIG. 7 depicts a cloud computing environment according to an embodiment of the present invention.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754D, and/or automobile computer system 754N may communicate. Nodes 710 may communicate with one another. A computing node 710 may have the same attributes as server 102 and client computer 132, each of which may be computing nodes 710 in a cloud computing environment. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
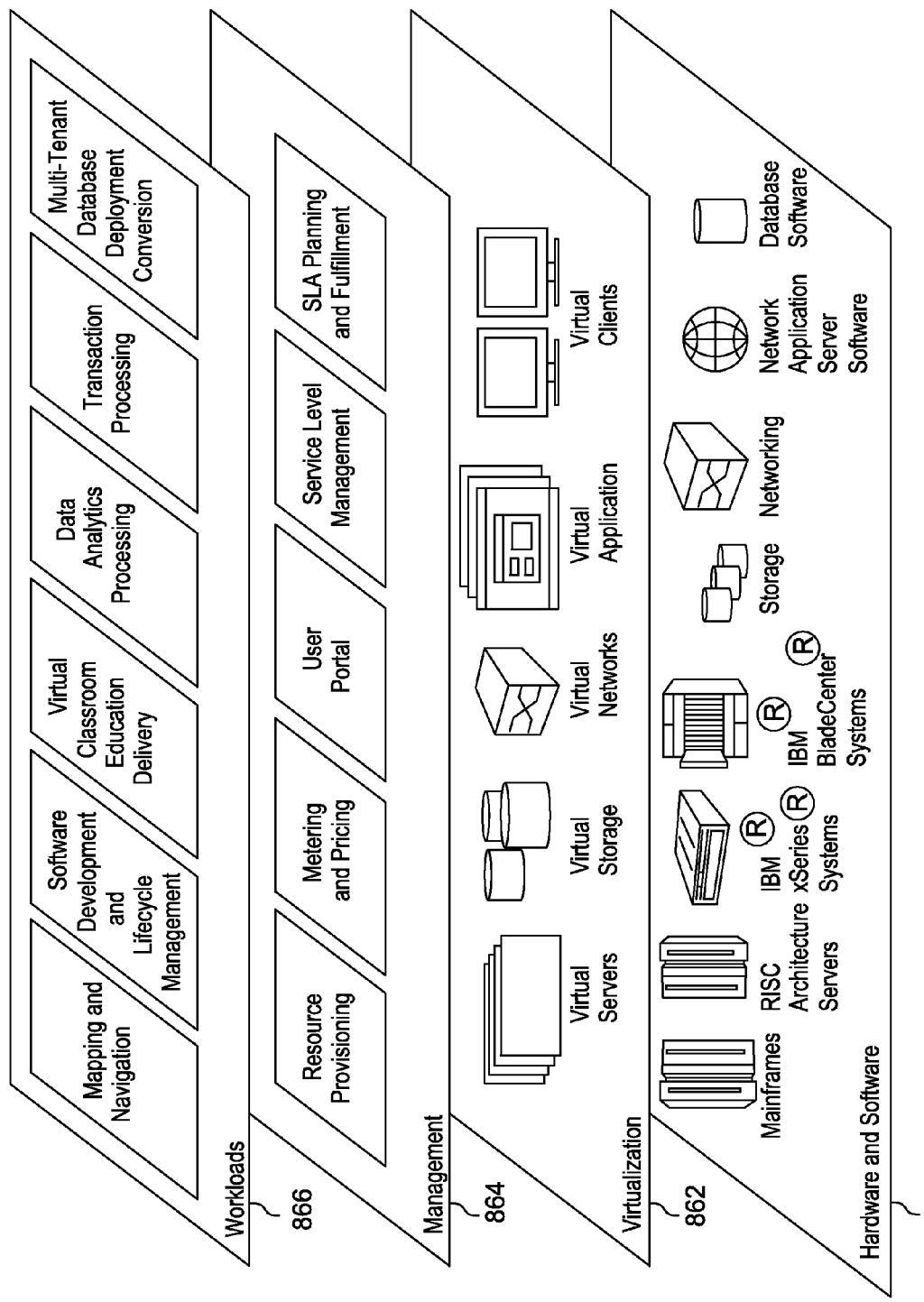
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and multi-tenant database deployment conversion.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing tenant-specific data sets in a multi-tenant system, comprising:
   receiving, through an abstraction layer, a request to convert a data set in a first database type to a second database type;
   retrieving, from the abstraction layer, tenant identification metadata identifying a tenant making the request;
   modifying the data set in the first database type based on the second database type, wherein modifying the data set comprises:
      creating a target database of the second database type, wherein the first database type is one of a private database and a shared database defined by a private schema, wherein the second database type is one of the private database and the shared database defined by the private schema;
      transferring a first table of the data set to a second table in the target database; and
      while transferring the first table to the target database:
         responsive to receiving a select query, issuing the select query to the first table and the second table;
         responsive to receiving an insert query, issuing the insert query to the second table;
         responsive to receiving a delete query, issuing the delete query to the first table and the second table; and
         responsive to receiving an update query, issuing the update query to the first table and the second table; and
   modifying, through the abstraction layer, metadata describing the first database type to describe the second database type, thereby allowing the modified data set to be accessed in the second database type.

2. The computer-implemented method of claim 1, wherein a union is applied to each resulting data set responsive to issuing the select query to the first table and the second table, wherein the union of the resulting data sets is returned as a set of results responsive to the select query.

3. The computer-implemented method of claim 1, wherein the first database type is the shared database defined by the private schema, wherein the private schema is specific to the identified tenant, wherein the second database type is the private database, wherein the modified metadata describing the second database type comprises a reference to a private schema for the private database.

4. The computer-implemented method of claim 1, wherein the first database type is the private database, wherein the second database type is the shared database defined by the private schema, wherein the private schema is specific to the identified tenant, wherein the modified metadata describing the second database type comprises a reference to the shared database and the private schema.

5. The computer-implemented method of claim 1, wherein an application accessing the tenant-specific data set in the first database type can access the tenant-specific data set in the second database type without requiring code modification, wherein the application is unaware of a physical implementation of the first or second database types, wherein the multi-tenant application issues the request through the abstraction layer, wherein the modified metadata in the data abstraction layer describing the second database type further comprises the tenant identification metadata.

6. The computer-implemented method of claim 5, wherein the modified metadata in the abstraction layer describing the second database type comprises: (i) an identifier of the private database, and (ii) an identifier of the shared database defined by the private schema.

7. The computer-implemented method of claim 6, wherein the abstraction layer, when receiving a query from the multi-tenant application, inserts at least a portion of the modified metadata into the query to identify the second database type.

* * * * *